US010632612B2

(12) United States Patent
Xiong et al.

(10) Patent No.: US 10,632,612 B2
(45) Date of Patent: Apr. 28, 2020

(54) ASSEMBLY FOR ROBOT AND ROBOT HAVING THE SAME

(71) Applicant: UBTECH Robotics Corp, Shenzhen (CN)

(72) Inventors: Youjun Xiong, Shenzhen (CN); Wenquan Shu, Shenzhen (CN); Feng Hu, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 282 days.

(21) Appl. No.: 15/716,436

(22) Filed: Sep. 26, 2017

(65) Prior Publication Data

US 2019/0001486 A1 Jan. 3, 2019

(30) Foreign Application Priority Data

Jul. 3, 2017 (CN) .......................... 2017 1 0531461

(51) Int. Cl.
*B25J 9/10* (2006.01)
*B25J 17/00* (2006.01)
(52) U.S. Cl.
CPC ............... *B25J 9/101* (2013.01); *B25J 9/102* (2013.01); *B25J 17/00* (2013.01)
(58) Field of Classification Search
CPC ...................................................... B25J 9/101
See application file for complete search history.

(56) References Cited

U.S. PATENT DOCUMENTS

| 3,260,375 | A | * | 7/1966 | Lemelson | ................ | B25J 9/101 414/728 |
| 3,419,158 | A | * | 12/1968 | Lemelson | ................ | B25J 9/101 414/728 |
| 4,015,721 | A | * | 4/1977 | Scheler | ...................... | B25J 9/04 414/744.3 |
| 4,674,948 | A | * | 6/1987 | Hornacek | .................. | B25J 5/02 414/269 |
| 5,508,686 | A | * | 4/1996 | Nihei | ....................... | B25J 9/101 340/679 |
| 8,051,770 | B2 | * | 11/2011 | Song | ....................... | B21C 47/24 100/12 |
| 8,833,196 | B2 | * | 9/2014 | Furuichi | .................. | B25J 9/042 74/490.01 |
| 9,796,097 | B2 | * | 10/2017 | Kirihara | .................... | B25J 17/02 |
| 9,871,435 | B2 | * | 1/2018 | Neff | ...................... | H02K 21/046 |
| 2005/0079042 | A1 | * | 4/2005 | Maeda | ...................... | B25J 9/042 414/744.2 |
| 2007/0089963 | A1 | * | 4/2007 | Kinoshita | ................ | B25J 9/101 192/125 A |
| 2008/0161829 | A1 | * | 7/2008 | Kang | ....................... | B25J 9/101 606/130 |
| 2015/0246450 | A1 | * | 9/2015 | Yoneda | .................... | B25J 9/101 74/490.05 |
| 2018/0186015 | A1 | * | 7/2018 | Xiong | ...................... | B25J 17/00 |

* cited by examiner

*Primary Examiner* — William Kelleher
*Assistant Examiner* — Gregory T Prather

(57) ABSTRACT

An assembly for a robot includes a servo comprising an output gear, a servo housing connected to the servo, a rotary support connected to the servo and the servo housing, the rotary support being configured to rotate as driven by the servo; and a stopper assembly arranged at the servo housing and the rotary support. The stopper assembly is used to limit the rotary support to be rotatable in a predetermined range.

17 Claims, 4 Drawing Sheets

ASSEMBLY FOR ROBOT AND ROBOT HAVING THE SAME

CROSS REFERENCE TO RELATED APPLICATIONS

This application claims priority to Chinese Patent Application No. 201710531461.5, filed Jul. 3, 2017, which is hereby incorporated by reference herein as if set forth in its entirety.

BACKGROUND

1. Technical Field

The present disclosure generally relates to robots, and particularly to an assembly for a robot and a robot having the assembly.

2. Description of Related Art

Robots are machines that perform actions in response to the instruction sent from a control terminal. A robot usually includes joint structures for constructing the feet, the legs and the elbows of the robot. Each joint structure includes a servo and connecting member that is rotatable with respect to the servo. In some conventional joint structures, when the connecting member rotates to a limit position, that is, the connecting member has rotated a maximum angle with respect to the servo, it will bump into the housing of the joint structures, which may affect the appearance of the housing, or even cause damages to the housing.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
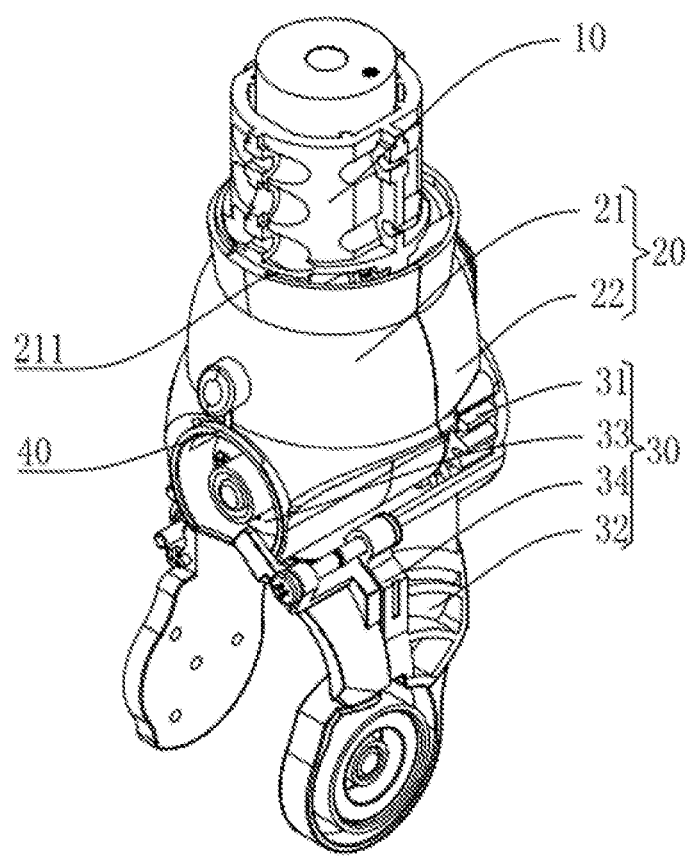
FIG. 1 is an isometric view of an assembly of a robot according to one embodiment.
Figure 2:
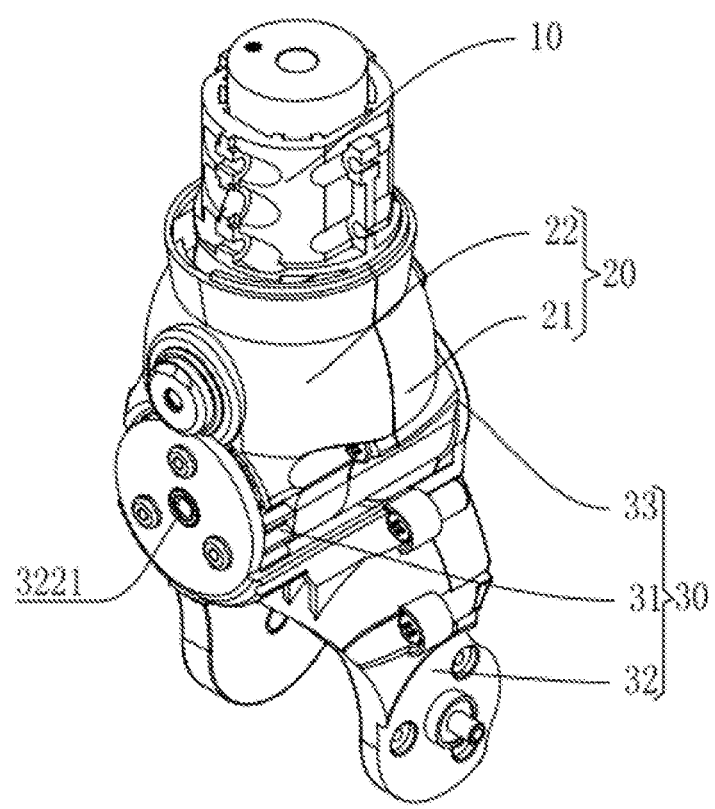
FIG. 2 is another isometric view of the assembly of FIG. 1, viewed from a first perspective.
Figure 3:
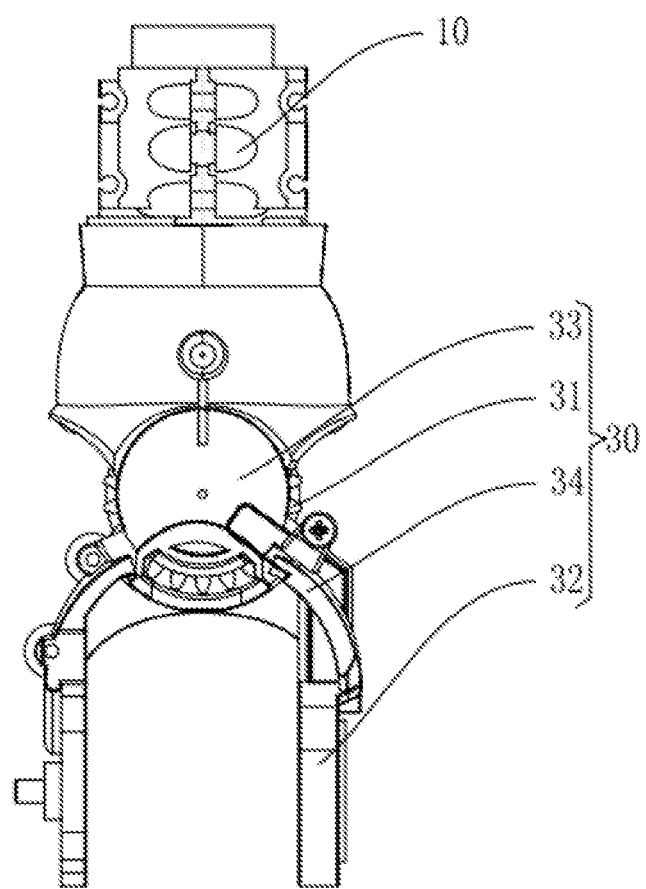
FIG. 3 is a front view of the assembly of FIG. 1.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

FIGS. 1-4 show an assembly for a robot according to an embodiment. The assembly can be applied in a robot and serve as the joint structure of an ankle of the robot. As shown in FIG. 1, the assembly includes a servo 10, a servo housing 20, a rotary support 30 and a stopper assembly 40. The servo 10 provides a driving force for the joint structure of the robot, which has the advantages of small size, light weight, large torque output and high precision. In the embodiment, the servo 10 is located at the joint of the knee of a leg of the robot. The servo 10 includes an output gear 13. The servo housing 20 is mounted to the servo 10 so as to protect the servo 10. The rotary support 30 is connected to the servo 10 and the servo housing 20 so as to drive the joint adjacent to the joint including the servo 10 to rotate when driven by the servo 10. The stopper assembly 40 is arranged at the servo housing 20 and the rotary support 30 so as to limit the rotary support to be rotatable in a predetermined range, thereby avoiding the damage caused by the servo housing 20 bumping into the rotary support 30 due to a large rotation angle.

By the provision of the stopper assembly 40, the rotary support 30 is prevented from rotating to a limit position, which prevents the rotary support 30 from bumping into the servo housing 20, thereby protecting the rotary support 30 and the servo housing 20.

Figure 4:
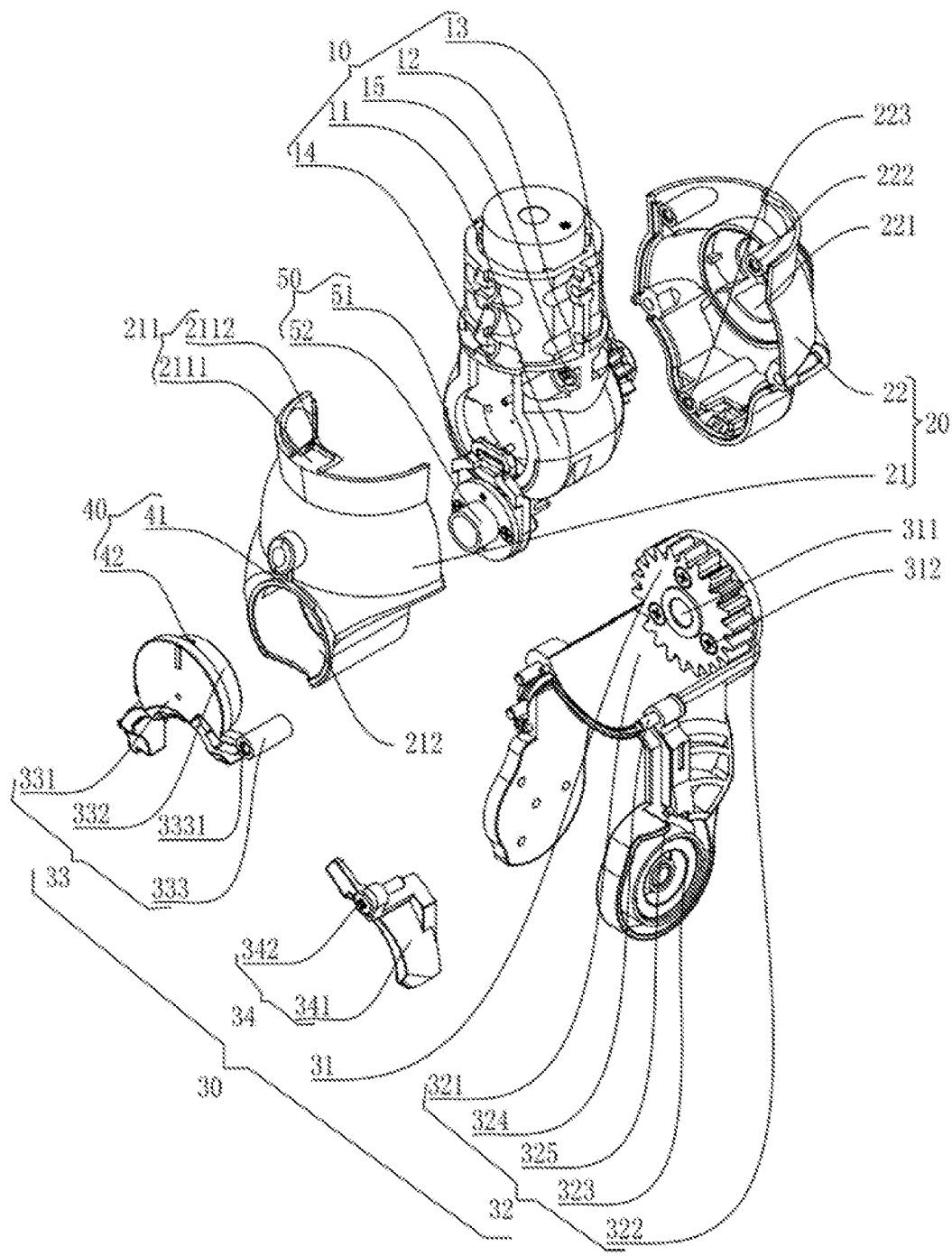
FIG. 4 is an isometric exploded view of the assembly of FIG. 1.

As shown in FIG. 4, the servo 10 includes a spherical portion 11, and a cylindrical portion 12 connected to the spherical portion 11. The output gear 13 is arranged at the spherical portion 11, and is engaged with a gear 31 of the rotary support 30. The servo 10 defines a fixing groove 14 that is located adjacent to the position where spherical portion 11 joins the cylindrical portion 12.

As shown in FIGS. 1-4, the servo housing 20 includes a front housing 21 and a rear housing 22 at opposite sides of the servo 10. The rear housing 22 is located at a side of the servo 10 where the output shaft 13 is located. The front housing 21 is connected to another side of the servo 10 opposite the side where the output shaft 13 is located. The front housing 21 and the rear housing 22 define corporately a closed space that receives the servo 10. The front housing 21 and the rear housing 22 may be connected to each other by mechanical locks or screws to form the space that receives the servo 10 therein so as to protect the servo 10. It is noted that the term "front" corresponds to the direction in which the robot moves forward, and the term "back" corresponds to the direction in which the robot moves backward.

As shown in FIG. 4, the front housing 21 includes a fixing member 211 and defines a mounting hole 212. The fixing member 211 is engaged with the fixing groove 14 to connect the servo housing 21 to the servo 10. Specifically, the end of the fixing member 211 is received in the corresponding fixing groove 211. The fixing member 211 includes a connecting portion 2111 extending from an upper edge of the front housing 21 and toward the fixing groove, and a limiting portion 2112 extending upwardly from one end of the connecting portion 2111. During assembling, the end of the fixing member 211 is caused to be received in the corresponding fixing groove 14 so as to connect the front housing 21 to the servo 10. The mounting hole 212 is defined in a lower portion of the front housing 21. The rear housing 22 defines an opening 221 that allows the output gear 13 to be partly exposed and a number of second positioning holes 222 and includes a post 223.

In the embodiment, the outer casing of the servo 10 defines a number of first positioning holes (not shown). The second positioning holes 222 are defined in the rear housing 22 and are arranged corresponding to the first positioning holes. During assembling, the output gear 13 of the servo 10 is arranged at the inner side of the rear housing 22 and is partly exposed through the opening 221. Screws 15 pass through the first positioning holes and are turned into the second positioning holes 222, with the end of the fixing member 211 received in the fixing groove 14, thereby mounting the servo 10 between the front housing 21 and the rear housing 22.

As shown in FIG. 4, the mounting hole 212 is defined in a lower portion of the front housing 21, and is mated with a second support 33 to connect the second support 33 to the front housing 21. In the embodiment, the stopper assembly 40 is arranged at the front housing 21 of the servo housing 20 and the second support 33. Specifically, the stopper assembly 40 includes an arc-shaped sliding groove 41 defined in the front housing 21 and a sliding block 42 arranged on the second support 33 and mated with the sliding groove 41. In the embodiment, the sliding groove 41 is defined in the front housing 21 adjacent to the mounting hole 212. The sliding block 42 is slidably received in the sliding groove 41. The rotary support 30 can then rotate with respect to the servo 10 in a range that is associated with the radian of the sliding groove 41.

As shown in FIGS. 1-4, the rotary support includes the gear 31, a first support 32, the second support 33 and a connection member 34. In the embodiment, the stopper assembly 40 is arranged the front housing 21 of the servo housing 20 and the second support 33. The gear 31 is fixed to the first support 32 and engaged with the output gear 13 of the servo 10. The second support 33 is connected to the first support 32 through the connection member 34, and is substantially parallel to the gear 31. The rotary support 30 can then rotate when driven by the output gear 13. Specifically, the servo 10 drives the output gear 13 to rotate, and the output gear 13 then rotates the gear 31, thereby enabling the rotary support 30 to rotate with respect to the servo 10 so as to achieve the motion of the joint. In the embodiment, the gear 31 defines a mounting hole 311. The mounting hole 311 is used for receiving the post 223 of the rear housing 22 so as to connect the rotary support 30 to the rear housing 22.

As shown in FIG. 4, the first support 32 incudes a first main body 321, a gear mounting portion 322 that protrudes from one end of the first main body 321 and allows the gear 31 to be mounted thereon, a joint connecting portion 323 extending from a side of the first main body 321 and away from the gear mounting portion 322, a first connecting post 324 and a second connecting post 325 that are located at opposite sides of the first main body 321. Each of the first connecting post 324 and the second connecting post 325 extends away from the gear mounting portion 322 and in a direction that is parallel to an axis of the gear 31. The first connecting post 324 is used to be connected with the second support 33, and the second connecting post 325 is used to be connected with the connection member 34. In the embodiment, the gear 31 is fixed to the gear mounting portion 322 via screws 312. The first main body 321 is partly tangent to the gear 31. In the embodiment, two joint connecting portions 323 are arranged at opposite sides of the first main body 32. Each joint connecting portion 323 includes an end connected to an edge of the first main body 321. The joint connecting portions 323 are used to connect with the joint (not shown) adjacent to the joint including the servo 10.

In the embodiment, the gear 31 is connected to the gear mounting portion 322 via screws 312. The number of the screws 312 may be three. The gear mounting portion 322 defines a through hole 3221 corresponding to the mounting hole 311. During assembling, the gear 31 is first connected to the gear mounting portion 322 via screws 312, with the post 223 passing through the through hole 3221 and the mounting hole 311, thereby connecting the gear 31 and the first support 32 to the rear housing 22.

As shown in FIG. 4, the second support 33 includes a second main body 331, a slider mounting portion 332 that protrudes from one side of the second main body 331, and a support connecting portion 333 that is connected to the second main body 331 at a lateral surface thereof. The sliding block 42 is arranged on the slider mounting portion 332. The support connecting portion 333 and the slider mounting portion 332 are located at a same side of the second main body 331. The slider mounting portion 332 is mated with the mounting hole 212 so as to mount the slider mounting portion 332 in the mounting hole 212, thereby connecting the second support 33 to the front housing 21. In the embodiment, the sliding groove 41 is defined in the front housing 21 adjacent to the upper edge of the mounting hole 212. The sliding block 42 is mated with the sliding groove 41 so as to limit the rotary support 30 to be rotatable in a predetermined range. The support connecting portion 333 is used to connect the first support 32 to the connection member 34. The support connecting portion 333 defines a first connection hole 3331 that allows the first connecting post 324 to be inserted thereinto so as to connect the second support 33 to the first support 32.

As shown in FIG. 4, the connection member 34 includes a main portion 341 and a screw 342 fixed to the main portion 341. The screw 342 is mated with the support connecting portion 333. The main portion 341 defines a second connection hole (not shown) that allows the second connecting post 325 to be inserted thereinto. During assembling, the second connecting post 325 of the first support 32 is caused to be inserted in to the second connection hole of the connection member 34. The screw 342 is then caused to pass through the main portion 341 and turned into the first connection hole 3331 of the second support 33. The screw 342 is engaged with the first connection hole 3331 to connect the second support 33 to the first support 32.

In the embodiment, the output gear 13 is arranged at the spherical portion 11 of the servo 10. The servo housing 20 and the rotary support 30 are mounted to the spherical portion 11. The servo housing 20 and the rotary support 30 both include arc-shaped surfaces. Specifically, the rotary support 30 includes the gear 31 engaged with the output gear 13 and the first support 32 that allows the gear 31 to be mounted thereon. The bottom surface of the first support 32 is an arc-shaped surface so as to receive the gear 31 therein and allow the gear 31 to rotate with respect to the output gear 13. More specifically, the first main body 321 is arc-shaped. The post 223 of the rear housing 22 is received in the through hole 3221 of the first support 32 and the mounting hole 311 of the gear 31. The gear mounting portion 322 is substantially circular and the rear housing 22 defines an arc-shaped recess that partly receives the gear 31 therein (see FIG. 2).

The stopper assembly 40 is arranged at the front housing 21 of the servo housing 20 and the second support 33. The second support 33 is connected to the first support 32 via the connection member 34. The gear 31 is fixed to the first support 32. Thus, the range in which the rotation of the first support 32 with respect to the output gear 13 of the servo 10 is limited by the engagement of the stopper assembly 40 with the first support 32, the second support 33 and the connection member 34, while be driving force of the servo 10 is increased by the engagement of the gear 31 and the output gear 13, which prevents the first support 32 and the connection member 34 from bumping into the front housing, thereby avoiding the occurrence that the appearance of outer casing of the assembly of the robot is affected or even damaged.

In the embodiment, the stopper assembly 40 includes the arc-shaped sliding groove 41 in the front housing 21 and the sliding block 42 on the second support 33. The sliding block 42 is received in the sliding groove 41. When the gear 31 of the rotary support 30 rotates with respect to the output gear 13 of the servo 10, the sliding block 42 moves in the sliding groove 41. Before the rotary support 30 rotates to a position where the rotary support 30 bumps into the servo housing 20, the sliding block 42 moves to one end of the sliding groove 41, which prevents the further movement of the sliding block 42, thereby limiting the rotary support 30 to be rotatable in a predetermined range. The occurrence that the appearance of outer casing of the assembly of the robot is affected or even damaged is avoided.

In the assembly of the robot, a flexible printed circuit (FPC) cable is used to connect at least two servos 10 so as to enable the assembly to have at least two degrees of freedom. During operation of the assembly of the robot, the FPC may bear too much tension or even torn apart, which affect the normal operation of the assembly. To avoid this, the assembly further includes a winding assembly 50 connected to the servo 10 and located within the servo housing 20. The winding assembly 50 is located at the side opposite the side where the output gear 13 is located. The winding assembly 50 is used to wind the FPC at the joint of the robot thereon, thereby avoiding the occurrence that the PFC bears too much tension or even torn apart during operation of the assembly of the robot.

Specifically, the winding assembly 50 includes a connection support 51 connected to the servo 10, a winding ring 52 mounted to the connection support 51, a connection block (not shown) connected to the connection block 51, and a fixing support (not shown) for fixing the connection block to the servo 10. In the embodiment, the first support 32 is connected to the rear housing 22 via the post 223. The rear housing 22 is connected to the servo 10 via screws 15, each of which passes through the first positioning hole and is turned into a second positioning hole 222. The arc-shaped first main body 321 of the first support 32 and the servo 10 define corporately a receiving space so as to receive the winding assembly 50. During assembling, the connection support 51 is first connected to the servo 10. The winding ring 52 is then fixed to the connection support 51. One end of the FPC is then connected to the circuit board of the servo 10. The end of the FPC connected to the servo is then held in position by the connection block. The connection block is then fixed to the servo 10 by the fixing support. The FPC is then wound on the winding ring 52 with a portion extending away from the winding ring to be connected with another servo 10. By the provision of the winding assembly 50, two ends of the FPC connected with two servos 10 are fixed and a portion of the FPC is wound on the winding ring 52, which avoids the occurrence that the FPC bears too much tension, thereby increasing the service life the FPC.

When the assembly of the robot is assumed, the rear housing 22 is connected to the side of the servo 10 where the output gear 13 is located. The connection support 51 is then connected to the other side of the servo 10. The FPC is then wound on the winding disc 52 with one end of the FPC connected to the servo 10. The end of the FPC is held in position by the connection block and the fixing support. The other end of the FPC is fixed to another servo (not shown) that is electrically connected to and adjacent to the servo 10. The front housing 21 is then connected to the servo 10 and the rear housing 22. The first support 32 is then connected to the servo housing 20 with the gear 31 of the first support 32 engaged with the output gear 13 of the servo 10. The second support 33 is then connected to the front housing 21 with the sliding block 42 received in the sliding groove 41. The first support 32 and the second support 33 are connected to each other via the connection member 34. The assembling process of the assembly of the robot is simple and easy.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An assembly for a robot, comprising:
   a servo comprising an output gear;
   a servo housing connected to the servo;
   a rotary support connected to the servo and the servo housing, the rotary support being configured to rotate as driven by the servo; and
   a stopper assembly arranged at the servo housing and the rotary support, the stopper assembly being configured to limit the rotary support to be rotatable in a predetermined range,
   wherein the rotary support comprises a gear, a first support, a second support and a connection member, the gear is fixed to the first support and engaged with the output gear, the second support is connected to the first support through the connection member, and the stopper assembly is arranged at the second support and the servo housing; and
   wherein the servo housing comprises a front housing, the front housing is connected to a first side of the servo opposite a second side where the output gear is located, the stopper assembly comprises a sliding groove defined in the front housing and a sliding block arranged on the second support and mated with the sliding groove.

2. The assembly of claim 1, wherein the front housing defines a mounting hole in a lower portion thereof, the mounting hole is mated with the second support, and the sliding groove is defined in the front housing adjacent to the mounting hole.

3. The assembly of claim 1, wherein the servo defines a fixing groove, the front housing comprises a fixing member, the fixing member comprises a connecting portion extending from an upper edge of the front housing and toward the fixing groove, and a limiting portion extending upwardly from one end of the connecting portion.

4. The assembly of claim 1, wherein the first support comprises a first main body, a gear mounting portion that protrudes from one end of the first main body and allows the gear to be mounted thereon, a joint connecting portion extending from a side of the first main body and away from the gear mounting portion, a first connecting post and a second connecting post that are located at opposite sides of the first main body, each of the first connecting post and the second connecting post extends away from the gear mounting portion and in a direction that is parallel to an axis of the gear, the first connecting post is configured to be connected with the second support, and the second connecting post is configured to be connected with the connection member.

5. The assembly of claim 4, wherein the second support comprises a second main body, a slider mounting portion that protrudes from one side of the second main body and allows the sliding block to be arranged thereon, and a support connecting portion that is connected to the second main body at a lateral surface thereof, the support connecting portion and the slider mounting portion are located at a same side of the second main body, the support connecting portion is configured to connect the first support to the connection member and defines a first connection hole that allows the first connecting post to be inserted thereinto.

6. The assembly of claim 5, wherein the connection member comprises a main portion and a screw fixed to the main portion, the screw is engaged with the first connection hole, and the main portion defines a second connection hole that allows the second connecting post to be inserted thereinto.

7. The assembly of claim 1, wherein the servo housing further comprises a rear housing, the rear housing is arranged at a side of the servo where the output gear is located, and the front housing and the rear housing define corporately a closed space that receives the servo.

8. A robot comprising an assembly, the assembly comprising:
   a serve comprising an output gear,
   a servo housing connected to the servo;
   a rotary support connected to the servo and the servo housing, the rotary support being configured to rotate as driven by the servo; and
   a stopper assembly arranged at the servo housing and the rotary support, the stopper assembly being configured to limit the rotary support to be rotatable in a predetermined range,
   wherein the rotary support comprises a gear, a first support, a second support and a connection member, the gear is fixed to the first support and engaged with the output gear, the second support is connected to the first support through the connection member, and the stopper assembly is arranged at the second support and the servo housing; and
wherein the servo housing comprises a front housing, the front housing is connected to a first side of the servo opposite a second side where the output gear is located, the stopper assembly comprises a sliding groove defined in the front housing and a sliding block arranged on the second support and mated with the sliding groove.

9. An assembly for a robot, comprising:
   a servo comprising an output gear;
   a servo housing connected to the servo;
   a rotary support configured to rotate as driven by the servo, the rotary support comprising a gear, a first support and a second support, the gear is fixed to the first support and engaged with the output gear, the first support and the second support being disposed on two opposing sides of the servo housing, respectively, the second support being fixed to the first support and rotatable together with the first support relative to the servo housing; and
   a stopper assembly arranged at the servo housing and the second support, the stopper being configured to limit a rotation of the second support relative to the servo housing in a predetermined range.

10. The assembly of claim 9, wherein the rotary support further comprises a connection member, the second support is fixed to the first support through the connection member.

11. The assembly of claim 10, wherein the first support comprises a first main body, a gear mounting portion that protrudes from one end of the first main body and allows the gear to be mounted thereon, a joint connecting portion extending from a side of the first main body and away from the gear mounting portion, a first connecting post and a second connecting post that are located at opposite sides of the first main body, each of the first connecting post and the second connecting post extends away from the gear mounting portion and in a direction that is parallel to an axis of the gear, the first connecting post is configured to be connected with the second support, and the second connecting post is configured to be connected with the connection member.

12. The assembly of claim 11, wherein the second support comprises a second main body, a slider mounting portion that protrudes from one side of the second main body and allows the sliding block to be arranged thereon, and a support connecting portion that is connected to the second main body at a lateral surface thereof, the support connecting portion and the slider mounting portion are located at a same side of the second main body, the support connecting portion is configured to connect the first support to the connection member and defines a first connection hole that allows the first connecting post to be inserted thereinto.

13. The assembly of claim 12, wherein the connection member comprises a main portion and a screw fixed to the main portion, the screw is engaged with the first connection hole, and the main portion defines a second connection hole that allows the second connecting post to be inserted thereinto.

14. The assembly of claim 9, wherein the servo housing comprises a front housing, the front housing is connected to a first side of the servo opposite a second side where the output shaft is located, the stopper assembly comprises a sliding groove defined in the front housing and a sliding block arranged on the second support and mated with the sliding groove.

15. The assembly of claim 14, wherein the front housing defines a mounting hole in a lower portion thereof, the mounting hole is mated with the second support, and the sliding groove is defined in the front housing adjacent to the mounting hole.

16. The assembly of claim 14, wherein the servo defines a fixing groove, the front housing comprises a fixing member, the fixing member comprises a connecting portion extending from an upper edge of the front housing and toward the fixing groove, and a limiting portion extending upwardly from one end of the connecting portion.

17. The assembly of claim 14, wherein the servo housing further comprises a rear housing, the rear housing is arranged at a side of the servo where the output gear is located, and the front housing and the rear housing define corporately a closed space that receives the servo.

* * * * *